United States Patent [19]
Tran et al.

[11] Patent Number: 5,859,992
[45] Date of Patent: Jan. 12, 1999

[54] INSTRUCTION ALIGNMENT USING A DISPATCH LIST AND A LATCH LIST

[75] Inventors: Thang M. Tran; Rammohan Narayan, both of Austin, Tex.; Jagadish V. Nayak, Del Mar, Calif.

[73] Assignee: Advanced Micro Devices, Inc., Sunnyvale, Calif.

[21] Appl. No.: 815,566

[22] Filed: Mar. 12, 1997

[51] Int. Cl.$^6$ ........................................................ G06F 9/00
[52] U.S. Cl. .......................... 395/380; 395/386; 395/391
[58] Field of Search .................................. 395/380, 391, 395/386, 384, 392

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 395/391 |
| 4,858,105 | 8/1989 | Kuriyama et al. | 395/582 |
| 4,928,223 | 5/1990 | Dao et al. | 395/597 |
| 5,053,631 | 10/1991 | Perlman et al. | 364/748.14 |
| 5,058,048 | 10/1991 | Gupta et al. | 364/748.14 |
| 5,129,067 | 7/1992 | Johnson | 395/389 |
| 5,136,697 | 8/1992 | Johnson | 395/391 |
| 5,226,126 | 7/1993 | McFarland et al. | 395/391 |
| 5,226,130 | 7/1993 | Favor et al. | 395/383 |
| 5,233,696 | 8/1993 | Suzuki | 395/380 |
| 5,371,864 | 12/1994 | Chuang | 395/386 |
| 5,535,347 | 7/1996 | Grochowski et al. | 395/380 |
| 5,586,276 | 12/1996 | Grochowski et al. | 395/380 |
| 5,600,806 | 2/1997 | Brown et al. | 395/380 |
| 5,604,909 | 2/1997 | JOshi et al. | 395/384 |
| 5,628,021 | 5/1997 | Iadonato et al. | 395/392 |
| 5,644,744 | 7/1997 | Mahin et al. | 395/380 |
| 5,673,410 | 9/1997 | Kurisu | 395/386 |
| 5,680,564 | 10/1997 | Divivier et al. | 395/380 |
| 5,748,978 | 5/1998 | Narayan et al. | 395/380 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pages 2–1 through 2–4, 1994 Dec.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?, "PC Magazine, Sep. 12, 1995, 16 pages.
Tom R. Halfhill, "AMD K6 Takes On Intel P6," BYTE, Jan. 1996, 4 pages.

*Primary Examiner*—Richard L. Ellis
*Assistant Examiner*—Patrice L. Winder
*Attorney, Agent, or Firm*—Conley, Rose & Tayon, PC; B. Noel Kivlin; Lawrence J. Merkel

[57] ABSTRACT

An instruction alignment unit includes a byte queue configured to store instruction blocks. Each instruction block includes a fixed number of instruction bytes and identifies up to a maximum number of instructions within the fixed number of instruction bytes. Additionally, the instruction alignment unit is configured to form a pair of instruction lists: a dispatch list and a latch list. The dispatch list includes instruction locators corresponding to instructions within the instruction blocks stored in the byte queue. Additionally, the first three instructions from instructions blocks being received from the instruction cache during a particular clock cycle are appended to the dispatch list. The dispatch list is used to select instructions from the byte queue for dispatch to the decode units. The latch list is used for receiving instruction locators for the remaining instructions from the instruction blocks received from the instruction cache during the particular clock cycle. Furthermore, the latch list receives instruction locators from the dispatch list which correspond to instructions not selected for dispatch to the decode units. The latch list is stored until a succeeding clock cycle, in which the stored program-ordered list is used as a basis for forming the dispatch list during that succeeding clock cycle. The instruction identification information and instruction bytes corresponding to the instruction can be located by selecting the instructions corresponding to the instruction locators at the front of the dispatch list.

19 Claims, 10 Drawing Sheets

| Valid 132 | Start Ptr 134 | End Ptr 136 | Valid Mask 138 | MROM/Fast Path 140 | Branch Prediction 142 |

| Address Bits 150 | Functional Bits 152 | Segment Limit 154 | Overflow 156 | Instruction Bytes 158 |

| I0 | I1 | I2 | Shared |
|---|---|---|---|
| 160 | 162 | 164 | 166 |

| Valid | Start Subqueue Position | End Subqueue Position | MROM/Fast Path |
|---|---|---|---|
| 172 | 174 | 176 | 178 |

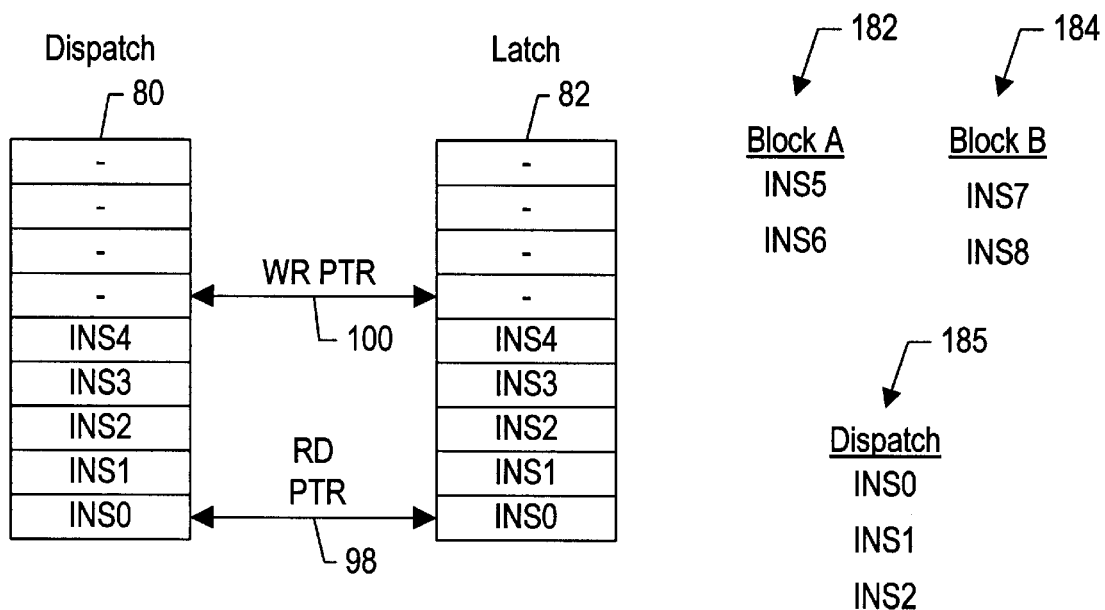
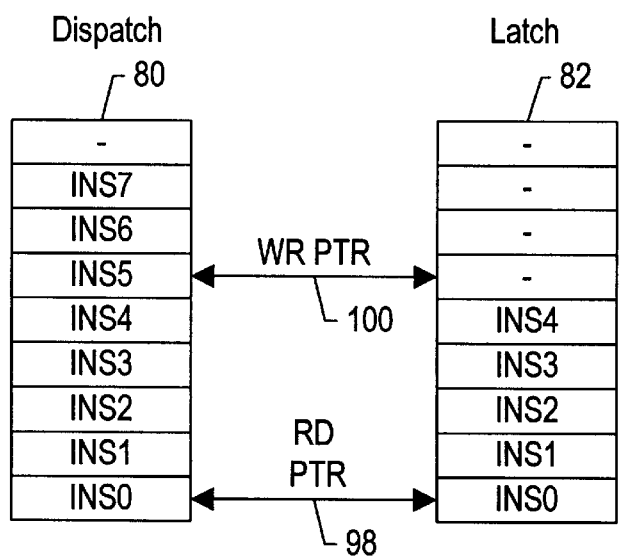
FIG. 11A
FIG. 11B

INSTRUCTION ALIGNMENT USING A DISPATCH LIST AND A LATCH LIST

BACKGROUND OF THE INVENTION

1. Field of the Invention

This invention relates to the field of microprocessors and, more particularly, to instruction alignment mechanisms within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 microprocessor specifies a variable length instruction set (i.e. an instruction set in which various instructions employ differing numbers of bytes to specify that instruction). For example, the 80386 and later versions of x86 microprocessors employ between 1 and 15 bytes to specify a particular instruction. Instructions have an opcode, which may be 1–2 bytes, and additional bytes may be added to specify addressing modes, operands, and additional details regarding the instruction to be executed.

Unfortunately, having variable byte length instructions creates numerous problems for dispatching multiple instructions per clock cycle. Because the instructions have differing numbers of bytes, an instruction may begin at any memory address. Conversely, fixed length instructions typically begin at a known location. For example, a 4 byte fixed length instruction set has instructions which begin at 4 byte boundaries within memory (i.e. the two least significant bits are zeros for the memory addresses at which instructions begin).

In order to locate multiple variable byte length instructions during a clock cycle, instruction bytes fetched by the microprocessor may be serially scanned to determine instruction boundaries and thereby locate instructions which may be concurrently dispatched. Serial scanning involves a large amount of logic, and typically a large number of cascaded logic levels. For high frequency (i.e. short clock cycle time) microprocessors, large numbers of cascaded logic levels may be deleterious to the performance of the microprocessor. Some microprocessor designs employ predecoding to identify the beginning and end of instructions as the instructions are stored into an instruction cache within the microprocessor. Even with predecoding, locating and dispatching multiple instructions per clock cycle is a complex and often clock-cycle-limiting operation. Multiple levels of multiplexing are employed, and significant bussing between the multiplexors and the instruction bytes being dispatched is needed to allow arbitrary selection of bytes from the instruction bytes being examined for dispatch. The first instruction to be dispatched may be located anywhere within the instruction bytes. The second instruction to be dispatched is then located at the end of the first instruction, etc.

SUMMARY OF THE INVENTION

The problems outlined above are in large part solved by an instruction alignment unit in accordance with the present invention. Coupled between an instruction cache and a plurality of decode units, the instruction alignment unit aligns instructions provided by the instruction cache to the decode units. The instruction alignment unit includes a byte queue configured to store instruction blocks. Each instruction block includes a fixed number of instruction bytes and identifies up to a maximum number of instructions within the fixed number of instruction bytes. Additionally, the instruction alignment unit is configured to form a pair of instruction lists: a dispatch list and a latch list. The dispatch list includes instruction locators corresponding to instructions within the instruction blocks stored in the byte queue. Additionally, the first three instructions from instructions blocks being received from the instruction cache during a particular clock cycle are appended to the dispatch list. The dispatch list is used to select instructions from the byte queue for dispatch to the decode units.

The latch list is used for receiving instruction locators for the remaining instructions from the instruction blocks received from the instruction cache during the particular clock cycle. Furthermore, the latch list receives instruction locators from the dispatch list which correspond to instructions not selected for dispatch to the decode units. The latch list is stored until a succeeding clock cycle, in which the stored program-ordered list is used as a basis for forming the dispatch list during that succeeding clock cycle. Instruction locators corresponding to the first three instructions from instruction blocks received during the succeeding clock cycle are appended to the program-ordered list to form the dispatch list in the succeeding clock cycle.

The instruction locators identify the position within the byte queue which stores instruction identification information regarding the corresponding instruction. Advantageously, the instruction identification information and instruction bytes corresponding to the instruction can be quickly located by selecting the instructions corresponding to the instruction locators at the front of the dispatch list. The instruction locators form selection controls for selecting the instructions from the byte queue. The instructions which may be dispatched in the current clock cycle are included in the dispatch list, while others are relegated to the latch list for dispatch consideration in a subsequent clock cycle. By limiting the instruction locators placed into the dispatch list to the instruction locators corresponding to instruction locators corresponding to those instructions which might possibly be dispatched during a given clock cycle, the dispatch list may be available early in the clock cycle. The dispatch list allows the rapid location of the instructions within the byte queue which are foremost in program order (i.e. the instructions to be dispatched). Instructions are quickly located despite that fact that they may be stored anywhere within the byte queue.

Broadly speaking, the present invention contemplates an instruction alignment unit comprising an instruction queue and a selection control unit. The instruction queue is configured to store multiple instruction blocks. Coupled to the instruction queue, the selection control unit is configured to store a program-ordered list of instruction locators corresponding to instructions stored in the instruction queue. The selection control unit is configured to append up to a predefined number of additional instruction locators corresponding to instructions within instruction blocks being concurrently received by the instruction queue to form a dispatch list. Additionally, the selection control unit is configured to select a plurality of instructions from the instruction queue using the dispatch list to identify the plurality of instructions. Still further, the selection control unit is configured to form a latch list by appending a remaining number of additional instruction locators corresponding to the instruction blocks being concurrently received by the instruction queue to the dispatch list. The selection control unit is configured to store the latch list whereby the latch list becomes the program-ordered list in a subsequent clock cycle.

The present invention further contemplates a method for selecting instructions for transmission to a plurality of decode units. A program-ordered list of instruction locators corresponding to instructions stored in an instruction queue coupled between an instruction cache and the plurality of decode units is stored. Up to a predefined number of additional instruction locators corresponding to instruction blocks being concurrently received by the instruction queue are appended to the program ordered list, thereby forming a dispatch list. A plurality of instructions are selected from the instruction queue using the dispatch list. A remaining number of additional instruction locators are appended to the dispatch list, thereby forming a latch list. The latch list becomes the program ordered list for a subsequent clock cycle.

BRIEF DESCRIPTION OF THE DRAWINGS

Other objects and advantages of the invention will become apparent upon reading the following detailed description and upon reference to the accompanying drawings in which:

FIG. 9 is a diagram of one embodiment of a subqueue within the byte queue.

FIG. 10 is a diagram of one embodiment of information stored for each instruction within the dispatch and latch lists.

FIGS. 11A, 11B, and 11C illustrate an example of the operation of the dispatch and latch lists.

Figure 1:
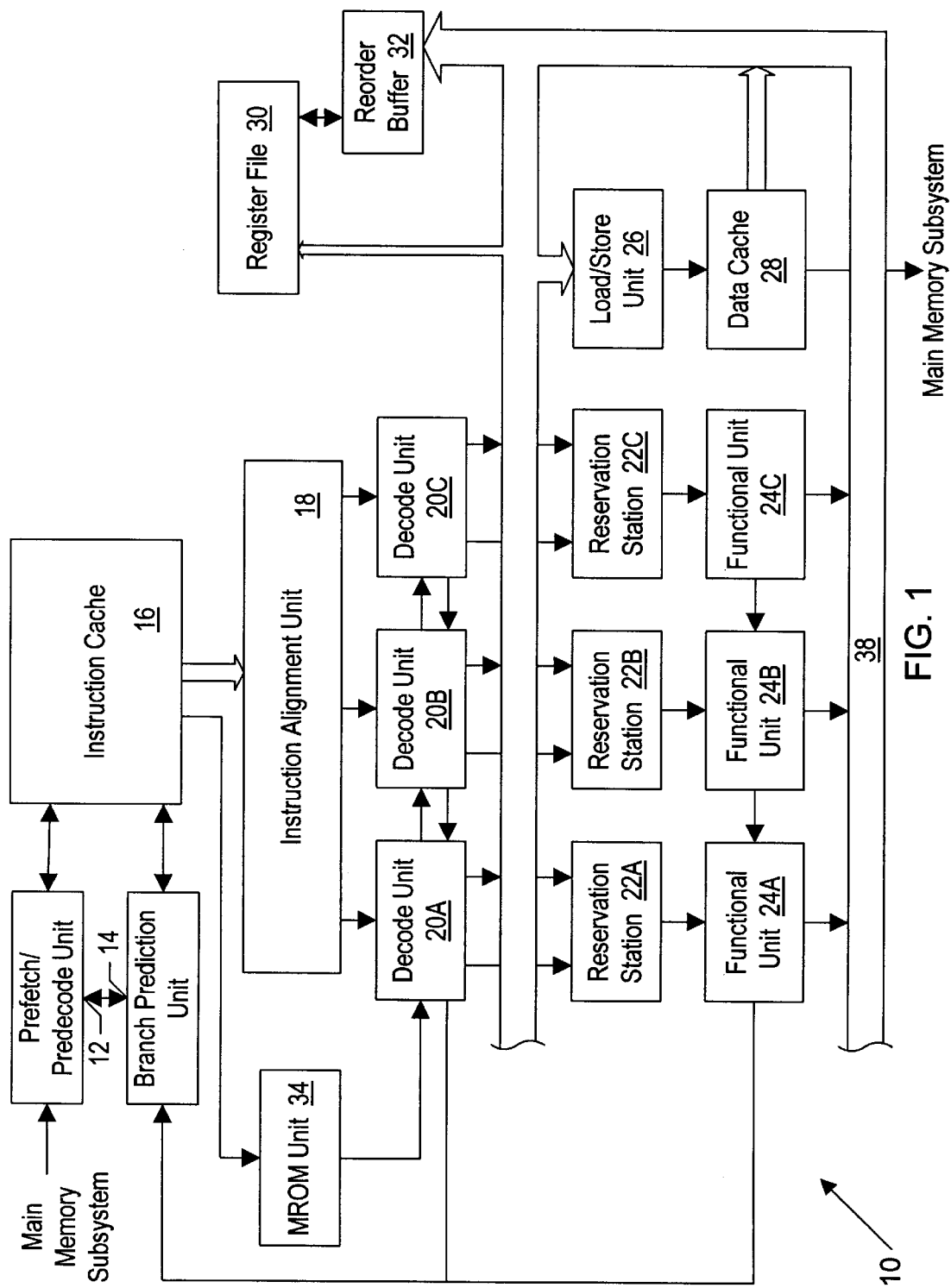
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, instruction alignment unit 18 is configured to receive instruction blocks from instruction cache 16 and to align instructions from the instruction blocks to decode units 20. Instruction alignment unit 18 employs a byte queue for storing the instruction blocks, and further employs a pair of instruction lists for selecting instructions from the byte queue for conveyance to decode units 20. The instruction lists store instruction locators which locate instructions within the byte queue. The lists are maintained in program order, and simplify the selection process. Since three decode units 20 are employed in the present embodiment, the up to three instruction locators at the head of the list are selected for dispatch. The instruction locators provide multiplexor selection controls for selecting instructions out of the byte queue. The selected instructions are subsequently filtered for invalid combinations as defined for the present embodiment of microprocessor 10. For example, an invalid combination may be more than one predicted taken branch in the selected instructions. Other invalid combinations may include more than one microcode instruction in the selected instructions and more than one fast path instruction selected along with a microcode instruction. The instructions which are allowed to dispatch to decode units 20 are deleted from the lists, thereby allowing subsequent instructions to be dispatched to decode units 20 during a subsequent clock cycle.

Two instruction lists are employed to facilitate instruction dispatch. The first list, referred to as the dispatch list, incorporates the instruction locators for instructions presently stored in the byte queue as well as the first three instructions (in program order) from the instruction blocks being conveyed by instruction cache 16 during a clock cycle. The three instructions at the head of the dispatch list are selected for dispatch, then filtered for invalid combinations. The second list maintained by instruction alignment unit 18 is the latch list. The latch list is stored by the instruction alignment unit 18 for use in forming the dispatch list for a subsequent clock cycle. The latch list receives the contents of the dispatch list as well as instruction locators corresponding to any remaining instructions from the instruction blocks being conveyed by instruction cache 16 during the clock cycle. In the present embodiment, for example, the fourth, fifth, and sixth instructions within the instruction blocks being conveyed by instruction cache 16 during the clock cycle (if present) are the remaining instructions to be included in the latch list. Furthermore, instructions being predecoded by prefetch/predecode unit 12 and which are concurrently being fetched may be included in the latch list. Instructions selected from the dispatch list for transmittal to decode units 20 are deleted from the latch list. The latch list is stored by instruction alignment unit 18 and is used as the basis for the dispatch list in the succeeding clock cycle. If instruction cache 16 provides additional instruction blocks during the succeeding clock cycle, the first three instructions from the additional instruction blocks are appended to the stored list in order to form the dispatch list for the succeeding clock cycle.

Because the first three instructions from instruction blocks being concurrently provided to the byte queue are included in the dispatch list, the dispatch list includes at least the maximum number of instructions which may be concurrently dispatched to decode units 20 unless the instructions within the instruction blocks stored in the byte queue and being received by the byte queue from instruction cache 16 are less in number than the maximum number of instructions. Therefore, the dispatch list provides for the greatest number of instructions dispatched in a particular clock given the constraints of the number of instructions provided during that particular clock cycle and other constraints imposed according to the pipeline definition of microprocessor 10 (e.g. invalid combinations). Since instructions beyond the first three provided by instruction cache 16 during a particular clock cycle cannot be dispatched during the particular clock cycle in the present embodiment, these remaining instructions need not be included in the dispatch list. Instead, they are included in the latch list for inclusion in the dispatch list during a subsequent clock cycle.

Additionally, since the dispatch and latch lists are used for selecting instructions from the byte queue, the byte queue need not be shifted each time instructions are dispatched. Instead, the byte queue is organized as multiple subqueues, each of which stores an instruction block. When all the instructions within an instruction block have been dispatched, the subqueues are shifted such that the fully dispatched instruction block is discarded and a subqueue at the end of the byte queue becomes available for storing subsequent instruction blocks to be provided by instruction cache 16.

An instruction block, as used herein, comprises a fixed number of bytes within which up to a maximum number of instructions per block are identified. A particular instruction block may include fewer instructions than the maximum number of instructions per block within its fixed number of bytes. Alternatively, a given fixed number of bytes within instruction cache 16 may include more instructions than the maximum number of instructions per block. In the latter case, two or more instruction blocks are formed from the given fixed number of bytes. Each instruction block includes the fixed number of bytes but identifies different instructions within the fixed number of bytes as comprising the instruction block. The fixed number of bytes are aligned to a boundary of the fixed number of bytes. In one embodiment, instruction blocks comprise eight bytes aligned on an eight byte boundary and the maximum number of instructions per block is three. The maximum number of instructions per block is selected because the average length of an x86 instruction is three bytes. Therefore, each eight bytes of instruction code includes $2\frac{2}{3}$ instructions on average. It is noted that the maximum number of instructions per block may be varied in various embodiments as a matter of design choice.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is inexecuted by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
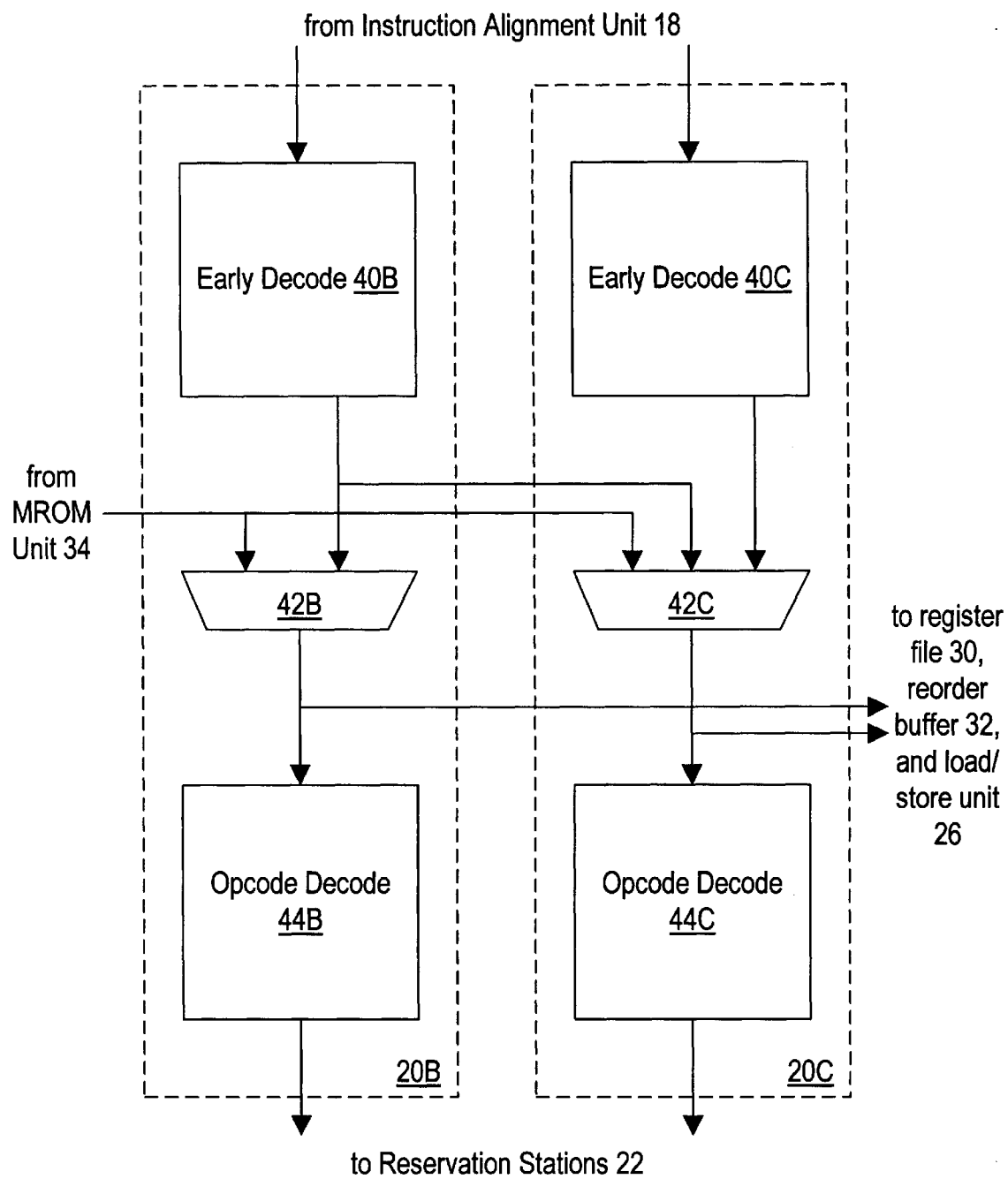
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
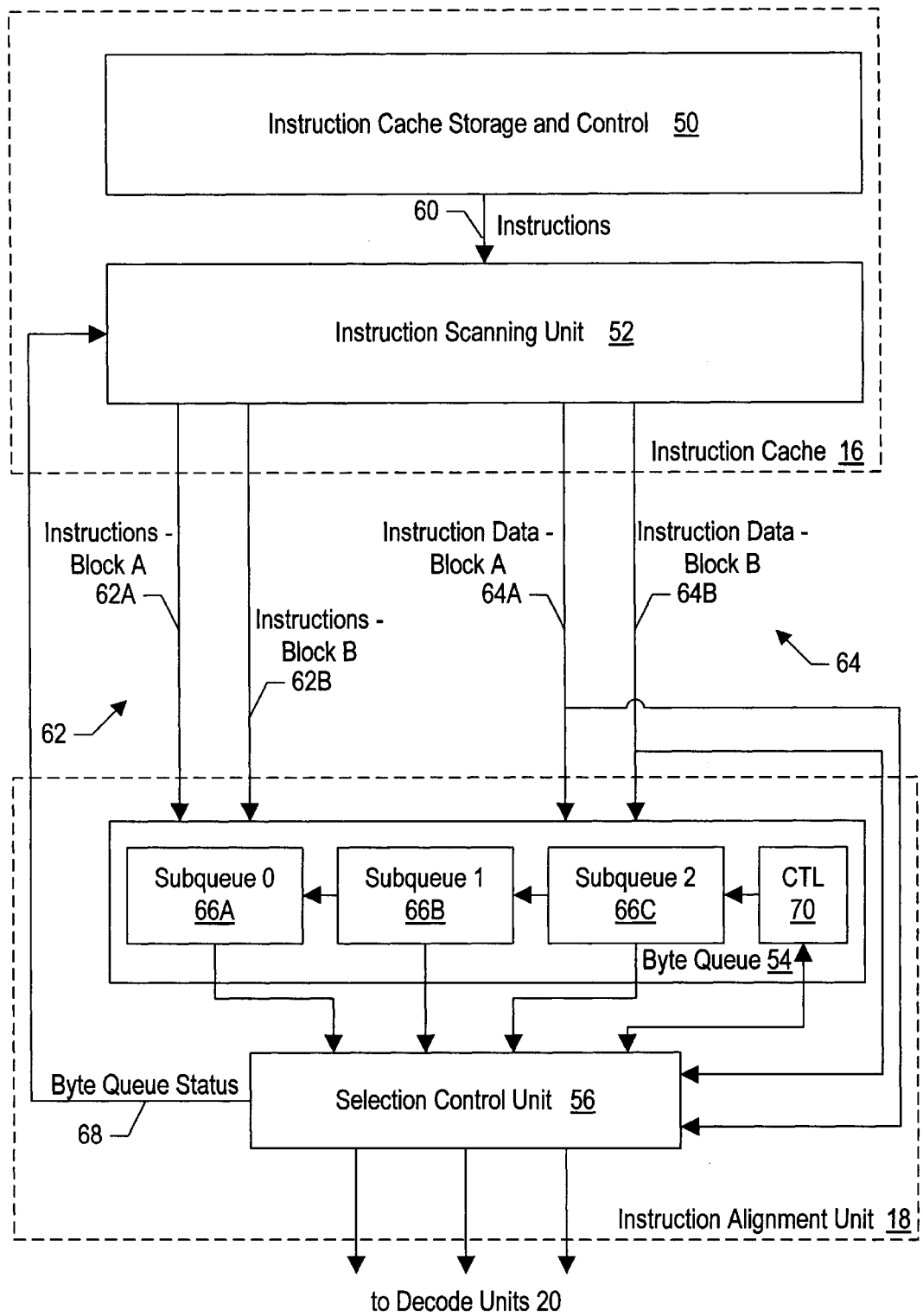
FIG. 3 is a more detailed block diagram of an instruction cache and instruction alignment unit shown in FIG. 1.

Turning now to FIG. 3, a block diagram of one embodiment of instruction cache 16 and instruction alignment unit 18 are shown. Instruction cache 16 includes an instruction cache storage and control block 50 and an instruction scanning unit 52. Instruction alignment unit 18 includes a byte queue 54 and a selection control unit 56.

Instruction cache storage and control block 50 includes storage for instruction cache lines and related control circuitry for fetching instructions from the storage, for selecting cache lines to discard when a cache miss is detected, etc. Instruction cache storage and control block 50 receives fetch addresses from branch prediction unit 14 (shown in FIG. 1) in order to fetch instructions for execution by microprocessor 10. Instruction bytes fetched from instruction cache storage and control block 50 are conveyed to instruction scanning unit 52 upon an instructions bus 60. Instruction bytes are conveyed upon instructions bus 60, as well as corresponding predecode data (e.g. start, end, and functional bits). In one embodiment, sixteen bytes stored in contiguous memory locations are conveyed upon instructions bus 60 along with the corresponding predecode data. The sixteen bytes form either the upper or lower half of the 32 byte cache line employed by instruction cache 16 according to the present embodiment. The upper half of the cache line is the half stored in memory addresses having larger numerical values, while the lower half is stored in memory addresses having smaller numerical values. Additionally, instruction scanning unit 52 receives information regarding the bytes within the sixteen bytes which are to be conveyed as instructions to instruction alignment unit 18. Instruction bytes at the beginning of the sixteen bytes may be ignored if the bytes are fetched as the target of a branch instruction, and the target address identifies a byte other than the first byte of the sixteen bytes. Additionally, if a branch instruction is within the sixteen bytes and branch prediction unit 14 predicts the branch taken, then bytes subsequent to the branch instruction within the sixteen bytes are ignored.

Instruction scanning unit 52 scans the predecode data associated with the bytes which are to be conveyed as instructions to instruction alignment unit 18. Instruction scanning unit 52 divides the sixteen bytes conveyed by instruction cache storage and control block 50 into two portions comprising eight contiguous bytes each. One portion forms the lower half of the sixteen bytes (i.e. the bytes stored at smaller numerical addresses than the bytes forming the upper half of the sixteen bytes). The other portion forms the upper half of the sixteen bytes. Therefore, an eight byte portion forms one of four quarters of the 32 byte cache line employed by instruction cache storage and control block 50, according to the present embodiment. As used herein, bytes are contiguous if they are stored in contiguous memory locations in the main memory subsystem. It is noted that particular sizes of various components are used herein for clarity of the description. Any size may be used for each component within the spirit and scope of the appended claims.

Instruction scanning unit 52 scans the predecode data of each portion of the instruction bytes independently and in parallel. These portions scanned by scanning unit 52 comprise the fixed number of bytes defined to be an instruction block. Instruction scanning unit 52 therefore scans the predecode data to identify up to the maximum number of instructions per block.

The instruction bytes and instruction identification information generated by instruction scanning unit 52 are conveyed to byte queue 54 upon an instructions bus 62 and an instruction data bus 64, respectively. As shown in FIG. 3, instructions bus 62 includes an instructions—block A bus 62A and an instructions—block B bus 62B. Instructions—block A bus 62A conveys the instruction bytes corresponding to the first instruction block being scanned by instruction scanning unit 52 (in program order). Similarly, instructions—block B bus 62B conveys the instruction bytes corresponding to the second instruction block being scanned by instruction scanning unit 52.

Instruction identification information corresponding to the instruction bytes conveyed upon instructions—block A bus 62A is conveyed upon instruction data—block A bus 64A. Similarly, instruction identification information corresponding to the instruction bytes conveyed upon instructions—block B bus 62B is conveyed upon instruction data—block B bus 64B. Instruction data—block A bus 64A and instruction data—block B bus 64B comprise instruction data bus 64 as shown in FIG. 3. Each eight byte portion and the corresponding instruction identification information forms an instruction block.

Byte queue 54 receives the instruction blocks conveyed and stores them into one of multiple subqueues included therein. In the embodiment shown, byte queue 54 includes three subqueues: a first subqueue 66A, a second subqueue 66B, and a third subqueue 66C. First subqueue 66A stores the instruction block which is foremost among the instruction blocks stored in byte queue 54 in program order. Second subqueue 66B stores the instruction block which is second in program order, and third subqueue stores the instruction block which is third in program order.

If a particular eight byte portion as scanned by instruction scanning unit 52 includes more than the maximum number of instructions per block, then the particular eight byte portion is retained by instruction scanning unit 52. During the following clock cycle, the particular eight byte portion is scanned again. The predecode data corresponding to the previously identified instructions included within the previously dispatched instruction block is invalidated such that instruction scanning unit 52 detects the additional instructions. If the other eight byte portion concurrently received with the particular eight byte portion is subsequent to the particular eight byte portion in program order, then the other eight byte portion is rescanned as well. Byte queue 54 discards the instruction block received from the other eight byte portion, in order to retain program order among the instruction blocks stored in the byte queue.

Selection control unit 56 conveys a byte queue status upon byte queue status bus 68 to instruction scanning unit 52. Byte queue status bus 68 includes a signal corresponding to each subqueue 66. The signal is asserted if the subqueue 66 is storing an instruction block, and deasserted if the subqueue 66 is not storing an instruction block. In this manner, instruction scanning unit 52 may determine how many instruction blocks are accepted by byte queue 54 during a clock cycle. If two instruction blocks are conveyed during a clock cycle and only one instruction block is accepted, instruction scanning unit 52 retains the rejected instruction block and rescans the instruction block in the subsequent clock cycle.

As noted above, an instruction block may contain up to a maximum number of instructions (e.g. three in the present embodiment). Additionally, eight contiguous bytes are conveyed for each instruction block. However, due to the variable byte length of the x86 instructions, an instruction may begin within one set of eight contiguous bytes and end in another set of eight contiguous bytes. Such an instruction is referred to as an overflow instruction. If an overflow instruction is detected, it is identified as the last of the maximum number of instructions. Instead of being indicated as a valid instruction within the instruction block, the overflow instruction is identified as an overflow. Instruction identification information is generated, but the instruction is handled somewhat differently, as will be explained in more detail below.

In one embodiment, the instruction identification information for each instruction includes: (i) start and end pointers identifying the bytes at which the identified instruction begins and ends within the instruction block; (ii) a valid mask a bit for each of the bytes within the instruction block; (iii) a bit indicative of whether the instruction is MROM or fast path; (iv) an instruction valid bit indicating that the instruction is valid; and (v) an overflow bit for the last instruction indicating that it is an overflow. The valid mask includes a binary one bit corresponding to each byte included within the particular instruction (i.e. the bits between the start pointer and end pointer, inclusive, are set). Zero bits are included for the other bytes. In addition to the above instruction identification information, instruction scanning unit 52 provides instruction locators for each instruction. The instruction locator for an instruction locates the instruction within byte queue 54 (i.e. subqueue and position within the subqueue). According to one embodiment, the instruction locator for an instruction comprises start and end positions within the instruction block. The start and end positions are stored in the instruction lists for selecting instructions from byte queue 54. For non-overflow instructions, the start and end positions are equal (i.e. position 0, 1, or 2 of a particular subqueue 66A–66C). Overflow instructions begin in position 2 of one subqueue 66A–66C and end in position 0 of another subqueue 66B–66C.

Additional information conveyed with the instruction identification information includes the taken/not taken prediction if the instruction is a branch instruction, bits indicating which of the quarters of the 32 byte cache line the eight bytes correspond to, the functional bits from the predecode data corresponding to the eight bytes, and a segment limit identifying the segment limit within the eight bytes for exception handling. The additional information is provided by instruction cache storage and control block 50 except for the branch prediction, which is provided by branch prediction unit 14.

Selection control unit 56 examines the instruction identification information stored in the dispatch list to generate selection controls for selecting instructions from byte queue 54. The selected instructions are then filtered for invalid combinations and conveyed to decode units 20.

It is noted that MROM instructions are identified by instruction scanning unit 52 as well. Instruction scanning unit 52 routes the MROM instructions to MROM unit 34 (not shown). However, the MROM instructions may flow through instruction alignment unit 18 as well. In this manner, instruction alignment unit 18 may detect the MROM instruction and convey it to decode units 20. MROM unit 34 may then insert the corresponding instructions between early decode units 40 and opcode decode units 44 when the MROM instruction arrives in early decode units 40, as described above with respect to FIG. 2.

A control unit 70 is included within byte queue 54 as well. Control unit 70, upon an indication that all instructions within a given instruction block have been dispatched to decode units 20, shifts the contents of each subqueue 66B–66C into an adjacent subqueue 66A–66B. In this manner, the instruction block which has been exhausted of instructions is discarded and other instruction blocks are maintained in program order. Control unit 70 further allocates subqueues 66 for storing instruction blocks provided by instruction scanning unit 52.

Figure 4:
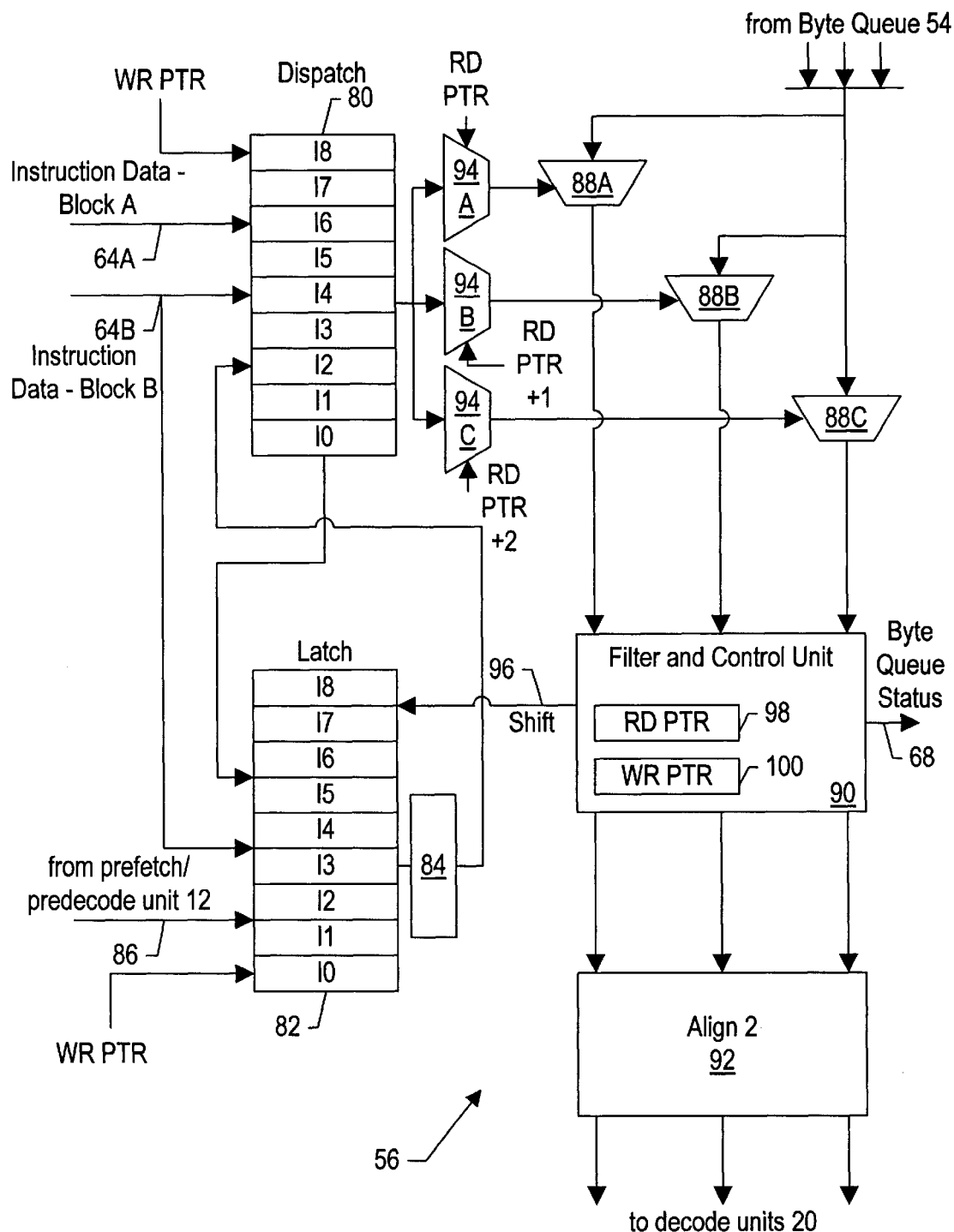
FIG. 4 is a block diagram of one embodiment of a selection control unit shown in FIG. 1.

Turning next to FIG. 4, a block diagram of one embodiment of selection control unit 56 is shown. Selection control unit 56 includes circuitry for forming a dispatch list 80 and a latch list 82. Additionally, a storage device 84 is included for storing the instruction locators comprising latch list 82. The output of storage device 84 comprises a program-ordered list used as a basis for forming dispatch list 80 during a clock cycle. Instruction data—block A bus 64A and instruction data—block B bus 64B provide additional input for forming dispatch list 80. Instruction data—block B bus 64B is further coupled as an input to latch list 82. Still further, prefetch/predecode unit 12 may provide an instruction upon a bus 86 to latch list 82. Instruction bytes and instruction identification information stored in byte queue 54 are provided to a set of multiplexors 88A–88C. Multiplexors 88 provide outputs to a filter and control unit 90, which routes the selected instructions (after filtering) to a second alignment stage 92. Second alignment stage 92 routes instructions to decode units 20. Selection controls for multiplexors 88 are provided from dispatch list 80 via a corresponding set of multiplexors 94A–94C. Filter and control unit 90 is coupled to byte queue status bus 68 and to a shift bus 96 which is coupled to latch list 82. Additionally, filter and control unit 90 maintains a read pointer 98 and a write pointer 100.

Dispatch list 80 and latch list 82 are each configured with a number of entries equal to the maximum number of instructions which may be stored in byte queue 54. For the embodiment shown in FIG. 4, each list includes 9 entries (three instructions may be stored in each the three subqueues 66). Each entry stores an instruction locator which locates the corresponding instruction within byte queue 54. More particularly, each subqueue includes three positions for instruction identification information. Therefore, an instruction locator indicates the subqueue and the position within the subqueue which stores instruction identification information corresponding to a particular instruction.

The instructions as represented within dispatch list 80 and latch list 82 are maintained in program order. Therefore, as instructions are provided from instruction scanning unit 52, the instructions are appended to the end of the list. The end of the list is indicated by write pointer 100. Instructions are selected for dispatch from the front of the list, which is indicated by read pointer 98. In the embodiment shown, entries are not shifted within dispatch list 80 and latch list 82. Instead, the read pointer and write pointer indicate the entries which are first and last, in program order, respectively. The read pointer is incremented by the number of instructions dispatched during a clock cycle. Similarly, the write pointer is incremented by the number of instructions received during a clock cycle.

Multiplexors 94 select instruction locators from dispatch list 80 based upon the value of read pointer 98. The read pointer indicates the instruction locator corresponding to the instruction which is first, in program order, within dispatch list 80. The read pointer incremented by one indicates the instruction locator which is second, in program order, within dispatch list 80. Similarly, the read pointer incremented by two indicates the instruction which is third, in program order, within dispatch list 80. Multiplexor 94A receives the read pointer and selects the indicated instruction locator from dispatch list 80. The instruction locator forms a selection control for multiplexor 88A, whereby instruction identification information from the subqueue and the position within the subqueue as indicated by the instruction locator provided by read pointer 98 is selected. Similarly, multiplexors 94B–94C select instruction locators as indicated by read pointer 98 incremented by one and by two, respectively. Multiplexors 88B–88C receive the selected instruction locators as selection controls and select corresponding instruction identification information and instruction bytes.

Filter and control unit 90 receives the instruction identification information and instruction bytes selected by multiplexors 88. Filter and control unit 90 filters the instructions for invalid combinations of instructions. Invalid combinations of instructions are combinations of instructions which cannot be dispatched concurrently to decode units 20 due to a restriction in the hardware employed by microprocessor 10. For example, reorder buffer 32 is a line-oriented reorder buffer according to one embodiment of microprocessor 10. Each line of instructions can store at most two program counter values for the instructions within the line. Therefore, at most one predicted taken branch instruction can be stored in a line (in which case one of the program counter values corresponds to the predicted taken branch instruction and any instructions prior to the branch instruction within the line, and the second program counter corresponds to the instructions within the line which lie at the target of the branch instruction). If two or more predicted taken branches are selected, then instructions prior to the second predicted taken branch are dispatched and the remaining instructions are withheld. Similarly, at most one microcode instruction is concurrently dispatchable within microprocessor 10. Second alignment stage 92 is used to synchronize microcode instructions with MROM unit 34, and MROM unit 34 operates upon one microcode instruction at a time. Therefore, a second microcode instruction must be synchronized independent of a first microcode instruction according to the present embodiment. If the instructions selected include more than one microcode instruction, instructions prior to the second microcode instruction are dispatched and the remaining instructions are withheld.

Filter and control unit 90 examines the instruction identification information for each instruction in order to select the instruction's bytes from the instruction bytes forming the corresponding instruction block. The instruction bytes are selected into a form allowing quick decode of the instruction. For example, the opcode byte may be selected out and provided at a particular position within the bus leading to a decode unit 20. Similarly, other bytes may be arranged for decode units 20.

In addition to filtering the instructions selected for dispatch, filter and control unit 90 updates read pointer 98 and write pointer 100 in response to the instructions received during the clock cycle and the instructions conveyed to second alignment state 92 (i.e. after filtering). Write pointer 100 is incremented by the number of instructions received, and read pointer 98 is incremented by the number of instructions conveyed. Additionally, if all the instructions from a particular instruction block have been exhausted, filter and control unit 90 asserts a shift signal upon shift bus 96 indicating that subqueues 66 are to shift the exhausted instruction block out of byte queue 54. According to the present embodiment, the instruction locators within dispatch list 80 and latch list 82 are one-hot encoded as to the subqueue 66 within which the corresponding instruction is stored. In other words, the subqueue identification is a three bit value, with a different one of the three bits corresponding to each of the subqueues 66. One of the three bits is set to indicate the subqueue 66 storing the instruction. When the instruction block including the instruction is shifted to another subqueue 66, the encoding can be shifted as well to indicate the subqueue 66 into which the instruction block is shifted. It is noted that control unit 70 within byte queue 54 (FIG. 3) receives shift bus 96 in order to shift the subqueues 66.

It is possible to exhaust more than one instruction block during a given clock cycle if the instruction blocks contain fewer than three instructions, an overflow instruction, or the instructions within the block are dispatched in different clock cycles. Signals upon shift bus 96 may be included such that a shift by one subqueue, by two subqueues, or by three subqueues can be indicated. Alternatively, byte queue 54 may be configured to shift one subqueue at a time and the shifting by two or three subqueues may be accomplished over multiple clock cycles. Filter and control unit 90 indicates the number of empty byte queues upon shifting in response to the signals on shift bus 96 via byte queue status bus 68.

According to one particular embodiment, double dispatch type microcode instructions are packed with a single fast path instruction to use the three available dispatch positions. Filter and control unit 90 allows one fast path instruction to be dispatched along with a microcode instruction (either prior to or subsequent to the microcode instruction in program order). For the particular embodiment, filter and control unit 90 retains the second of the two instructions dispatched when packing is performed (in other words, read pointer 98 is incremented by one instead of two despite the dispatch of two instructions to decode units 20). If the microcode instruction is found to be a non-double-dispatch type microcode instruction, the second of the instructions is selected for dispatch again during the succeeding clock cycle. If the microcode instruction is found to be a double-dispatch type instruction, read pointer 98 is incremented prior to selecting instructions in the succeeding clock cycle. The determination of the double dispatch/non-double dispatch type is conveyed by MROM unit 34 to second alignment stage 92 as part of the microcode synchronization.

Dispatch list 80 receives the program-ordered list stored in storage location 84 (i.e. latch list 82 as formed in the immediately preceding clock cycle). Additionally, dispatch list 80 receives the instruction locators corresponding to instruction blocks provided by instruction scanning unit 52. Write pointer 100 indicates the entry within dispatch list 80 which is to receive the instruction locator corresponding to the first of the instructions provided within the first instruction block from instruction scanning unit 52. Write pointer 100 incremented by one indicates the entry to receive the second instruction and write pointer 100 incremented by two indicates the entry to receive the third instruction received within the instruction blocks provided by instruction cache 16. The entries indicated by write pointer 100 and its incremented values receive the corresponding instruction locators, as explained in more detail below. Otherwise, the corresponding entry from storage device 84 (which corresponds to the corresponding entry from latch list 82 during the previous clock cycle) is stored into the dispatch list entry.

Latch list 82 similarly receives the contents of dispatch list 80, as well as the instruction locators received upon instruction data—block B bus 64B and an instruction locator from prefetch/predecode unit 12. Latch list 82 receives any remaining instruction locators from instruction scanning unit 52 upon instruction data—block B bus 64B (i.e. instruction locators not received into dispatch list 80). In other words, if the instruction blocks provided by instruction scanning unit 52 include a fourth, a fifth, or a sixth instruction, these instructions are received into latch list 80 and not into dispatch list 82. The logic for determining which instructions within the instruction blocks are fourth, fifth, and sixth in order is more complex than locating the first three instructions and may therefore require additional cascaded levels of logic. Since dispatch list 80 is used early during a given clock cycle to select instruction identification information via multiplexors 88 and 94, determining the fourth, fifth and sixth instructions and attempting to insert them in dispatch list 80 may require too much of the clock cycle. Since at most three instructions are selected for dispatch according to the present embodiment, the fourth, fifth, and sixth instructions may be received into latch list 80 and placed into dispatch list 82 during a subsequent clock cycle without incurring a performance penalty as compared to an embodiment which receives all instructions into dispatch list 80. If a fourth instruction is included in the instruction blocks provided by instruction scanning unit 52 during a clock cycle, the corresponding instruction locator is stored into latch list 80 at the entry indicated by write pointer 100 incremented by three. Similarly, the fifth and sixth instructions are stored into the entry indicated by write pointer 100 incremented by four and five, respectively.

In certain cases, instructions may be provided from prefetch/predecode unit 12 instead of instruction scanning unit 50. For example, if requested instructions miss in instruction cache 16, the instructions are fetched from main memory. As the instruction bytes are received, the instruction bytes are predecoded by prefetch/predecode unit 12. One instruction is predecoded at a time, and the predecode sequence may require several clock cycles to complete. As the instructions are predecoded, the predecoded instruction is provided to byte queue 54. Additionally, an instruction locator corresponding to the instruction is provided upon bus 86. The instruction locator is stored into the entry of latch list 82 identified by the write pointer.

According to one particular embodiment, read pointer 98 and write pointer 100 comprise one-hot encodings. Each pointer comprises nine bits (one bit corresponding to each entry within dispatch list 80/latch list 82). When encoded in this manner, the pointers can directly be used as multiplexor select signals for multiplexors 94. For example, if the third least significant bit of read pointer 98 is set, then position I2 of dispatch list 80 is selected by multiplexor 94A. Additionally, incrementing read pointer 98 and write pointer 100 to provide read pointer 98 incremented by one and two and write pointer 100 incremented by one, two, three, four, and five may be accomplished simply by routing the wires which convey read pointer 98 and write pointer 100. For example, equation 1 below shows the derivation of a nine bit read pointer 98 incremented by one from the corresponding read pointer 98:

$$RDPTR+1[8:0]=RDPTR[7:0]||RDPTR[8] \quad (1)$$

In other words, RDPTR+1 is RDPTR rotated left by one bit. Similarly, RDPTR+2 may be generated as shown in equation 2 below, and write pointers may be generated from write pointer 100 in a similar manner:

$$RDPTR+2[8:0]=RDPTR[6:0]||RDPTR[8:7] \quad (2)$$

As mentioned above, an instruction may begin in one instruction block and end in another instruction block due to the variable byte length nature of the x86 instruction set. If one or more of the instruction blocks containing an overflow instruction are received in different clock cycles, then information regarding the beginning of the overflow instruction (e.g. the start pointer portion of the instruction locator) may be stored by filter and control unit 90 until the information regarding the end of the overflow instruction (e.g. the end pointer portion of the instruction locator) is received. The instruction locator may then be assembled and placed into dispatch list 80. Alternatively, the information regarding the beginning of the overflow instruction may be stored into dispatch list 80 but not validated until the remaining information regarding the overflow instruction is received.

It is noted that read pointer 98 and write pointer 100 are equal if byte queue 54 is empty during a clock cycle. In this manner, instruction locators corresponding to instructions from instruction blocks being conveyed by instruction cache 16 during a clock cycle may be conveyed through dispatch list 80 to cause dispatch of the instructions as they are received. Additionally, it is noted that an instruction is deleted from latch list 82 by invalidating the instruction locator corresponding to the deleted instruction and by incremented read pointer 98.

Figure 5:
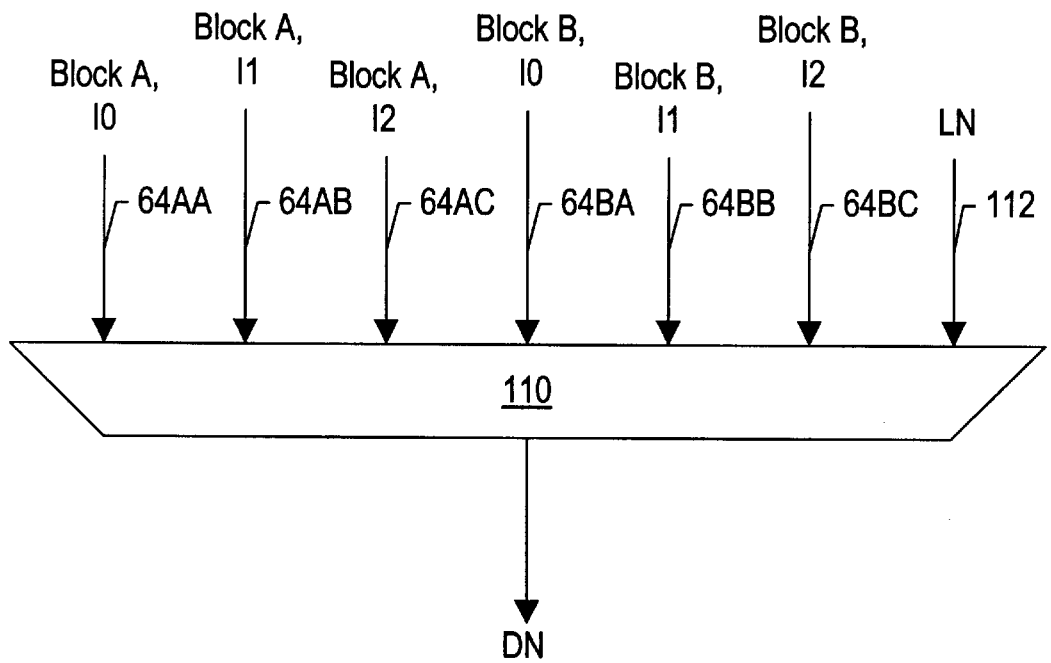
FIG. 5 is a diagram of one embodiment of an input multiplexor to a dispatch list shown in FIG. 4.

Turning now to FIG. 5, a multiplexor 110 is shown. The output of multiplexor 110 forms entry "N" of dispatch list 80. Entry "N" is one of the nine entries in dispatch list 80. Multiplexors similar to multiplexor 110 may be used to form the other entries in the list.

Multiplexor 110 receives the instruction locators corresponding to the first, second, and third instructions within the first instruction block being conveyed from instruction cache 16 via instruction data—block A bus 64A. The instruction locators for each of the first, second, and third instructions are shown conveyed upon buses in FIG. 5 at reference numbers 64AA, 64AB and 64AC, respectively. When taken together, the buses 64AA, 64AB and 64AC comprise the portion of instruction data—block A bus 64A received by selection control unit 56. Similarly, the instruction locators corresponding to the first, second, and third instructions from the second instruction block being conveyed by instruction cache 16 are received upon buses 64BA, 64BB, and 64BC (which together form the portion of instruction data—block B bus 64B received by selection control unit 56). Additionally, the corresponding entry from latch list 82 is received upon a bus 112. It is noted that the corresponding entry from latch list 82 is stored in storage device 84 prior to being conveyed upon bus 112.

The instruction locator selected by multiplexor 110 depends upon the instructions within the instruction blocks being conveyed by instruction cache 16 and upon the value of write pointer 100, as well as write pointer 100 incremented by one and by two. If the bit of write pointer 100 corresponding to entry "N" is set, then the instruction locator corresponding to the first instruction within the first and second instruction blocks is selected. Similarly, if the bit of write pointer 100 incremented by one corresponding to entry "N" is set, the instruction locator corresponding to the second instruction within the first and second instruction blocks is selected. Finally, if the bit of write pointer 100 incremented by two corresponding to entry "N" is set, the instruction locator corresponding to the third instruction within the first and second instruction blocks is selected. If none of the previous conditions apply, then the corresponding entry from latch list 82 is selected. It is noted that logic for locating the first, second, and third instruction within the first and second instruction blocks, given a valid indication for each position within the instruction block, is well known to the skilled artisan.

Figure 6:
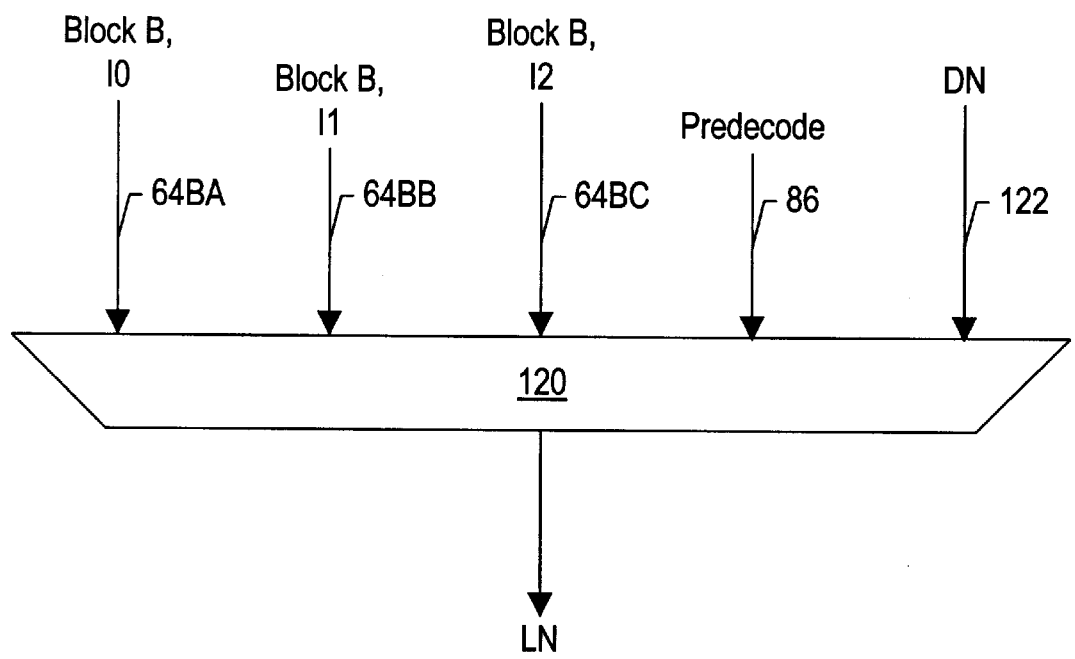
FIG. 6 is a diagram of one embodiment of an input multiplexor to a latch list shown in FIG. 4.

Turning next to FIG. 6, a multiplexor 120 is shown. The output of multiplexor 112 forms entry "N" of latch list 82. Entry "N" is one of the nine entries in latch list 82. Multiplexors similar to multiplexor 112 may be used to form the other entries in the list.

Multiplexor 120 receives the instruction locators corresponding to the first, second, and third instructions within the second instruction block being conveyed by instruction cache 16 (reference numbers 64BA, 64BB, and 64BC). Additionally, an instruction locator is received from prefetch/predecode unit 12 via bus 86. Finally, the corresponding entry from dispatch list 80 is received upon a bus 122.

Multiplexor 120 selects one of the instruction locators from the second instruction block if the corresponding instruction is fourth of the instructions within the first and second instruction blocks and the bit of write pointer 100 incremented by three corresponding to entry "N" is set. Similarly, multiplexor 120 selects one of the instruction locators from the second instruction block if the corresponding instruction is the fifth or sixth within the first and second instruction blocks being conveyed by instruction cache 16 and the bit of write pointer 100 incremented by four or five (respectively) corresponding to entry "N" is set. Alternatively, prefetch/predecode unit 12 may convey an instruction to byte queue 54 and the corresponding instruction locator to selection control unit 56. During clock cycles that prefetch/predecode unit 12 conveys an instruction, multiplexor 120 selects the instruction locator upon bus 86 if the bit of write pointer 100 corresponding to entry "N" is set. Finally, if none of the aforementioned cases is detected, the corresponding entry from dispatch list 80 is selected from bus 122.

Figure 7:
FIG. 7 is a diagram of one embodiment of information stored for each instruction within a byte queue shown in FIG. 3.

Turning now to FIG. 7, a diagram is shown depicting exemplary information stored in a position 130 of subqueues 66A–66C, according to one embodiment. For example, position 130 may be position I0, I1, or I2 for the first, second, or third instruction within an instruction block. Each position stores equivalent information regarding different instructions. Position 130 stores a valid indication 132, a start pointer 134, an end pointer 136, a valid mask 138, an MROM/fast path indication 140, and a branch prediction indication 142.

Valid indication 132 identifies the validity or invalidity of the remainder of the information stored in position 130. If the valid indication indicates validity, then instruction identification information is stored in position 130. If the valid indication indicates invalidity, then instruction identification information is not stored within position 130 (i.e. position 130 is empty). In one embodiment, valid indication 132 comprises a bit indicative, when set, that instruction identification information is stored within position 130. When clear, the bit indicates that instruction identification information is not stored within position 130.

Start pointer 134 and end pointer 136 locate the byte positions within the instruction block at which the instruction identified in position 130 begins and ends, respectively. For embodiments in which an instruction block includes 8 bytes, start pointer 134 and end pointer 136 each comprise three bit values indicating the numerical position between zero and seven of the respective start or end point. Valid mask 138 is a mask of zeros and ones. Each bit in the mask corresponds to one of the bytes within the instruction block. Bits in the mask corresponding to bytes not included within the instruction identified by position 130 are set to zero. Conversely, bits in the mask corresponding to bytes included within the instruction are set to one. For example, if the instruction identified by position 130 begins at the third byte within the instruction block and ends at the fifth byte within the instruction block, the start pointer is 010, the end pointer is 100, and the mask is 00111000 (all expressed in binary format). The start pointer, end pointer, and mask are used to generate selection controls for selecting bytes within the instruction block when the instruction is selected for issue.

MROM/fast path indication 140 indicates the MROM or fast path nature of the instruction identified by position 130. In one embodiment, indication 140 comprises a bit indicative, when set, that the instruction is an MROM instruction. When clear, the bit indicates that the instruction is a fast past instruction. Finally, branch prediction indication 142 comprises a bit indicative, when set, that the instruction is a branch instruction which is predicted taken. When clear, the bit indicates that the instruction is either not a branch instruction or is a branch instruction predicted not taken.

Figure 8:
FIG. 8 is a diagram of one embodiment of information stored for an instruction block within the byte queue.

Turning now to FIG. 8, a diagram is shown depicting exemplary information stored in a shared field 148 of a subqueue 66A–66C. Information stored in shared field 148 is shared information valid for the entire instruction block, according to one embodiment. An address bits field 150, a functional bits field 152, a segment limit field 154, an overflow indication 156, and an instruction bytes field 158 are included. Address bits field 150 stores a pair of address bits which identify the quarter of the cache line from which the instruction block was fetched. Functional bits field 152 stores the original functional bits from the predecode data associated with the instruction bytes within the instruction block.

Segment limit field 154 is used to detect instructions being dispatched from outside the code segment. As will be appreciated by those skilled in the art, the x86 microprocessor architecture divides the memory space into segments. One of these segments is the code segment, from which instructions are fetched. The segment has a defined limit, which may be of arbitrary size. If instruction execution proceeds outside of the code segment, a segment limit violation exception is signalled. Microprocessor 10 may handle segment limit violations as follows: if an entire set of instructions fetched from instruction cache 16 during a clock cycle lies outside the code segment, the instructions are not conveyed to instruction alignment unit 18. Instead, the segment limit violation is signalled to reorder buffer 32. If instructions prior to the segment limit violation retire successfully (as opposed to being discarded due to branch misprediction or other exception), then the exception may be taken at that time. However, the limit may be arbitrary and therefore may fall within the set of instructions fetched from instruction cache 16. Segment limit field 154 is included for handling this case. If the limit is crossed within the instruction block stored in instruction bytes storage 82, then segment limit field 154 indicates which byte position represents the segment limit. In one embodiment, segment limit field 154 comprises three bits to indicate a limit at one of the eight bytes within the instruction block. If an instruction beyond the limit imposed by segment limit field 154 is dispatched, an exception is signalled to reorder buffer 32.

Overflow indication 156 indicates that one of the instructions within the instruction block overflows into the subsequent instruction block. Information regarding the overflowing instruction is stored in position I2 of the corresponding subqueue 66A–66C. In one embodiment, overflow indication 156 comprises a bit indicative, when set, that an instruction within the instruction block overflows. When clear, the bit indicates that no instruction within the instruction block overflows. If overflow indication 156 is set, then the valid indication within position I2 is clear. Alternatively, overflow indication 156 is clear if the valid indication within position I2 is set. In this manner, position I2 is indicated either to store an overflow instruction or a valid instruction ending within the instruction block, but not both. Additionally, position I2 is indicated to be not storing an instruction if both overflow indication 156 and the valid indication for position I2 are clear. Instruction bytes field 158 stores the actual instruction bytes included within the instruction block. In one embodiment, instruction bytes field 158 is eight bytes wide.

Turning now to FIG. 9, a diagram of one embodiment of subqueue 66A is shown. Subqueues 66B–66C may be similar. FIG. 9 illustrates the fields within subqueue 66A used to store instruction information. As shown in FIG. 9, subqueue 66A includes a first instruction position 160, a second instruction position 162, a third instruction position 164, and a shared field 166. Instruction positions 160, 162, and 164 store information as shown for position 130 in FIG. 7. First instruction position 160 identifies the instruction which is first within the instruction block stored in subqueue 66A in program order. Second instruction position 162 identifies the instruction which is second within the instruction block stored in subqueue 66A in program order. Third instruction position 164 identifies the instruction which is third in program order within the instruction block. Shared field 166 stores information as shown in shared field 148 in FIG. 8.

Turning next to FIG. 10, a diagram illustrating an instruction locator 170 as may be stored in an entry within dispatch list 80 and latch list 82 is shown, according to one embodiment of selection control unit 56. Instruction locator 170 includes a valid indication 172, a start subqueue position indication 174, and end subqueue position indication 176, and an MROM/Fast path indication 178. Valid indication 172 is comparable to valid indication 132 shown in FIG. 7. Similarly, MROM/Fast path indication 178 is comparable to MROM/Fast Path indication 140 shown in FIG. 7.

Start subqueue position indication 174 and end subqueue position indication 176 identify the subqueue 66A–66C and the position 160–164 within the subqueue 66A–66C which stores instruction identification information corresponding to a particular instruction. Start subqueue position indication 174 locates the position within a subqueue which stores information regarding the start of an instruction (i.e. the start pointer 134 and valid mask 138). End subqueue position indication 176 locates the position within a subqueue which stores information regarding the end of the instruction (i.e. the end pointer 136, valid mask 138, MROM/Fast path indication 140, and branch prediction indication 142). For instructions other than overflow instructions, start subqueue position indication 174 and end subqueue position indication 176 identify the same subqueue 66A–66C and the same position 160–164 within the subqueue 66A–66C. For overflow instructions, different subqueues 66A–66C are identified by start subqueue position indication 174 and end subqueue position indication 176. Additionally, different positions 160–164 may be identified by the start and end subqueue position indications 174 and 176. For overflow instructions, the valid masks 134 located by the start and end subqueue position indications are concatenated to form the valid mask.

According to one particular embodiment, start subqueue position indication 174 and end subqueue position indication 176 comprise one-hot encodings for the subqueue 66A–66C and for the position 160–164 within the subqueue which stores instruction identification information regarding the corresponding instruction. For the embodiment shown in FIG. 3, for example, a three bit encoding is included for one of the three subqueues 66A–66C. Additionally, a three bit encoding is included for one of the three positions within the identified subqueue. Since the encodings are one-hot, the values can be used directly as multiplexor select controls for multiplexors 88 as shown in FIG. 4.

As used herein, the term "one-hot encoding" refers to an encoding in which at most one bit within the encoding is set at any given time. In other words, the interpretation of a bit within the encoding being set of clear is independent of the other bits within the encoding. For example, each bit of an encoding may correspond to a different subqueue. If the bit is set, the subqueue is indicated regardless of the settings of the other bits.

Figure 11C:
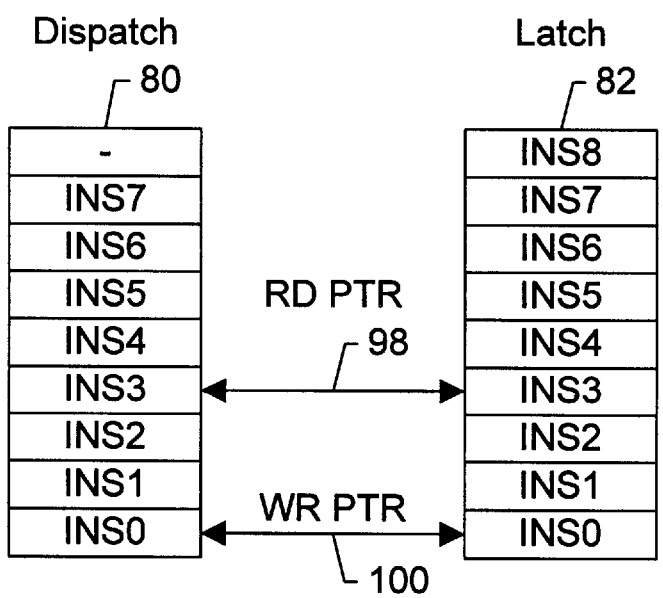

Turning next to FIGS. 11A, 11B, and 11C, an example of the operation of dispatch list 80 and latch list 82 is shown. FIG. 11A illustrates an initial state of dispatch list 80 and latch list 82 at the beginning of a particular clock cycle. FIG. 11B illustrates a state during the particular clock cycle after dispatch list 80 has been updated with instruction locators of instructions from instruction blocks being conveyed by instruction cache 16 during the particular clock cycle. Finally, FIG. 11C illustrates a final state of dispatch list 80 and latch list 82 at the end of the particular clock cycle. The final state as shown in FIG. 11C reflects receipt of a first instruction block 182 and a second instruction block 184 and dispatch of instructions within the list.

As shown in FIG. 11A, the initial state of dispatch list 80 and latch list 82 includes instruction locators corresponding to five instructions (INS0 through INS4). INS0 is first in program order, followed by INS1, etc. Read pointer 98 is shown in the initial state indicating the entry in dispatch list 80 and latch list 82 corresponding to instruction INS0. Write pointer 100 indicates the entry immediately subsequent to the entry allocated to instruction INS4.

First block 182 includes instructions INS5 and INS6, and second block 184 includes instructions INS7 and INS8. Instruction INS5 is prior to instruction INS6 in program order, which is prior to instruction INS7 in program order, etc. First block 182 and second block 184 are received during the particular clock cycle. Additionally, instructions INS0 through INS2 are selected for dispatch during the particular clock cycle, as indicated at reference number 186.

FIG. 11B illustrates an intermediate state of dispatch list 80 and latch list 82 during the particular clock cycle. Instructions INS5–INS7 are the first three instructions provided in first instruction block 182 and second instruction block 184. Therefore, instruction locators corresponding to instructions INS5–INS7 are stored into dispatch list 80 at the position indicated by the initial write pointer, the initial write pointer incremented by one, and the initial write pointer incremented by two.

Turning to FIG. 11C, the final state of dispatch list 80 and latch list 82 is shown. Dispatch list 80 includes instructions INS5, INS6, and INS7 appended to the list stored in the initial state, as shown in FIG. 11B. Additionally, instruction INS8 is received as a fourth instruction. Instruction INS8 is stored into latch list 82 at the position indicated by the initial write pointer incremented by three. The final value of write pointer 100 is formed by incrementing the initial value by four (the number of instructions received).

Since three instructions (INS0–INS2) are selected for dispatch via the initial value of read pointer 98, the initial value of read pointer 98 incremented by one, and the initial value of read pointer 98 incremented by two, and the three instructions are allowed to dispatch through filter and control unit 90, the final value of the read pointer is the initial value incremented by three (the number of instructions dispatched to decode units 20). The final value of read pointer 100 is illustrated in FIG. 11C.

Figure 12:
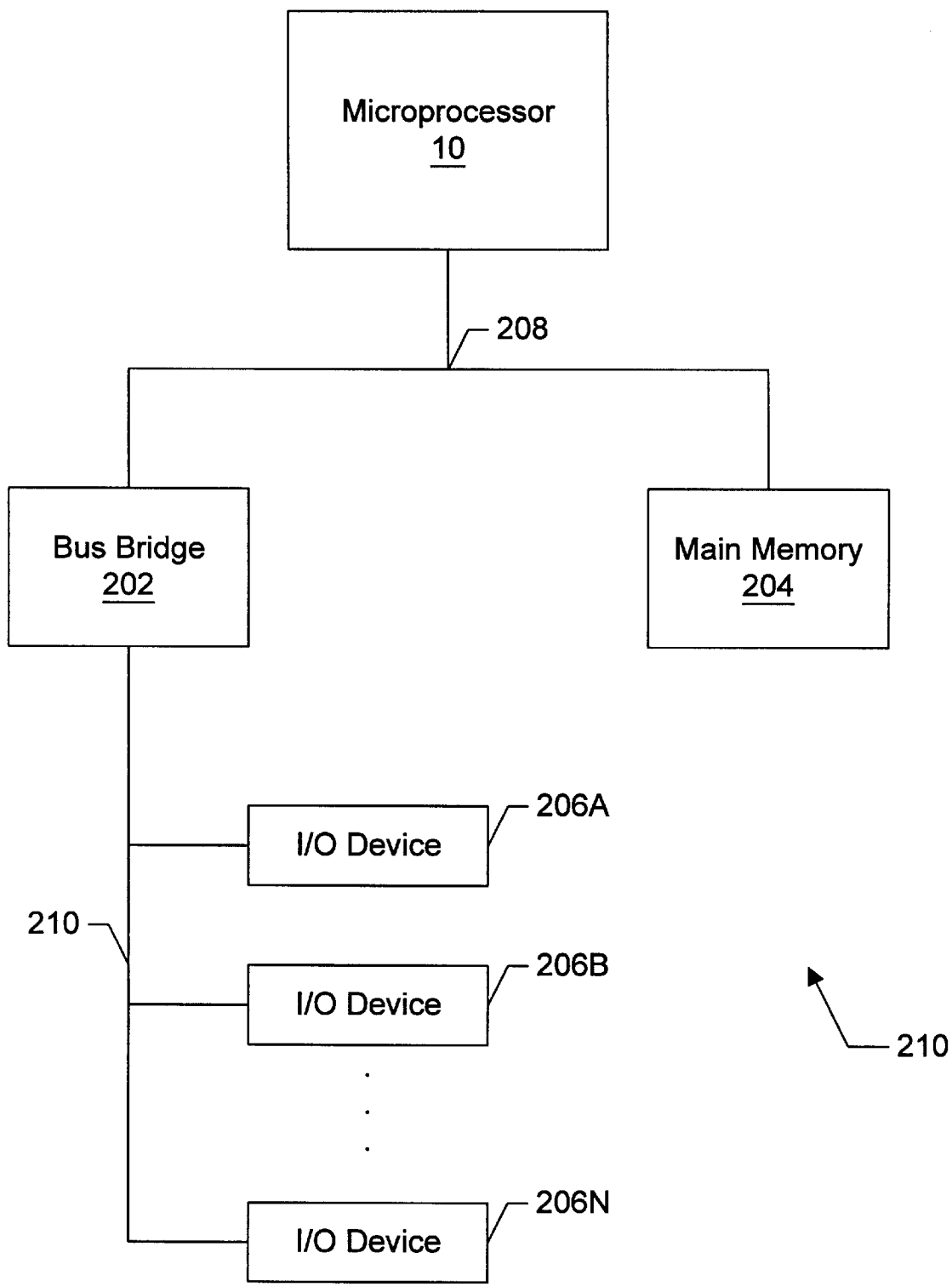
FIG. 12 is a block diagram of a computer system including the microprocessor shown in FIG. 1.

Turning now to FIG. 12, a computer system 200 including a microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 12 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is noted that the term "instruction locator", when used herein, refers to information which locates an instruction within byte queue 54. Instruction identification information, on the other hand, locates the instruction within the instruction bytes of a particular instruction block. It is further noted that instructions may be referred to herein as being "stored" in byte queue 54. An instruction is stored in byte queue 54 if the instruction is identified within an instruction block stored in the byte queue and the instruction has not been dispatched to decode units 20.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
| --- | --- |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |

TABLE 1-continued x86 Fast Path, Double Dispatch, and MROM Instructions

| X86 Instruction | Instruction Category |
|---|---|
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

In accordance with the above disclosure, an instruction alignment unit is shown which forms dispatch and latch lists for instructions stored in a byte queue within the instruction alignment unit. The instructions represented at the head of the list are selected for dispatch, and newly received instructions are appended to the end of the list. Advantageously, instructions can be quickly located within the list and selected for dispatch.

Numerous variations and modifications will become apparent to those skilled in the art once the above disclosure is fully appreciated. It is intended that the following claims be interpreted to embrace all such variations and modifications.

What is claimed is:

1. An instruction alignment unit comprising:
   an instruction queue configured to store multiple instruction blocks; and
   a selection control unit coupled to said instruction queue, wherein said selection control unit is configured to store a program-ordered list of instruction locators corresponding to instructions stored in said instruction queue, and wherein said selection control unit is configured to append up to a predefined number of additional instruction locators corresponding to instructions within instruction blocks being concurrently received by said instruction queue to form a dispatch list, and wherein said selection control unit is configured to select a plurality of instructions from said instruction queue using said dispatch list to identify said plurality of instructions, and wherein said selection control unit is configured to form a latch list by appending a remaining number of additional instruction locators corresponding to said instruction blocks being concurrently received by said instruction queue to said dispatch list, and wherein said selection control unit is configured to store said latch list whereby said latch list becomes said program-ordered list in a subsequent clock cycle.

2. The instruction alignment unit as recited in claim 1 wherein said selection control unit is configured to maintain a read pointer identifying a first instruction locator within said program-ordered list, and wherein a first one of said plurality of instructions is identified by said first instruction locator.

3. The instruction alignment unit as recited in claim 2 wherein said read pointer incremented by one identifies a second instruction locator within said program ordered list, and wherein a second one of said plurality of instructions is identified by said second instruction locator.

4. The instruction alignment unit as recited in claim 3 wherein said selection control unit is further configured to maintain a write pointer identifying a third instruction locator within said program ordered list, wherein said third instruction locator is invalid, and wherein a first one of said additional instruction locators is stored into said dispatch list at an entry identified by said write pointer.

5. The instruction alignment unit as recited in claim 4 wherein, if said program ordered list is empty, said read pointer is equal to said write pointer.

6. The instruction alignment unit as recited in claim 5 wherein said first one of said additional instruction locators comprises said first instruction locator if said program ordered list is empty.

7. The instruction alignment unit as recited in claim 1 wherein said selection control unit is configured to delete instruction locators corresponding to said plurality of instructions from said dispatch list to form said latch list.

8. The instruction alignment unit as recited in claim 1 wherein said instruction queue comprises a plurality of subqueues, and wherein each of said plurality of subqueues is configured to store a different instruction block.

9. The instruction alignment unit as recited in claim 8 wherein a particular instruction locator comprises an indication of which one of said plurality of subqueues is storing a particular instruction corresponding to said particular instruction locator.

10. The instruction alignment unit as recited in claim 9 wherein said particular instruction locator further comprises a position of said particular instruction within said instruction block.

11. A method for selecting instructions for transmission to a plurality of decode units comprising:

storing a program ordered list of instruction locators corresponding to instructions stored in an instruction queue coupled between an instruction cache and said plurality of decode units;

appending up to a predefined number of additional instruction locators corresponding to instruction blocks being concurrently received by said instruction queue to said program ordered list, thereby forming a dispatch list;

selecting a plurality of instructions from said instruction queue using said dispatch list;

appending a remaining number of additional instruction locators to said dispatch list, thereby forming a latch list, wherein said latch list becomes said program ordered list for a subsequent clock cycle.

12. The method as recited in claim 11 further comprising deleting instruction locators corresponding to said plurality of instructions from said latch list.

13. The method as recited in claim 11 wherein said instruction queue comprises a plurality of subqueues, each of which is configured to store a different instruction block.

14. The method as recited in claim 13 wherein a particular instruction locator identifies one of said plurality of subqueues storing an instruction block including a particular instruction corresponding to said particular instruction locator.

15. The method as recited in claim 14 wherein said particular instruction locator further identifies a position within said one of said plurality of subqueues corresponding to said particular instruction.

16. The method as recited in claim 11 wherein said selecting includes filtering said plurality of instructions for invalid combinations.

17. The method as recited in claim 16 wherein one of said invalid combinations comprises more than one branch instruction within said plurality of instructions.

18. The method as recited in claim 16 wherein one of said invalid combinations comprises more than one microcode instruction within said plurality of instructions.

19. The method as recited in claim 16 wherein one of said invalid combinations comprises more than one fast path instruction and a microcode instruction within said plurality of instructions.

* * * * *